(12) United States Patent
Reshef et al.

(10) Patent No.: US 7,355,923 B2
(45) Date of Patent: *Apr. 8, 2008

(54) SEISMIC ANALYSIS USING POST-IMAGING SEISMIC ANISOTROPY CORRECTIONS

(75) Inventors: Moshe Reshef, Tel Aviv (IL); Murray W. Roth, Highlands Ranch, CO (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/126,828

(22) Filed: May 11, 2005

(65) Prior Publication Data

US 2005/0207278 A1 Sep. 22, 2005

Related U.S. Application Data

(63) Continuation of application No. 10/637,411, filed on Aug. 8, 2003, now Pat. No. 6,904,368.

(60) Provisional application No. 60/427,312, filed on Nov. 12, 2002.

(51) Int. Cl.
*G01V 1/36* (2006.01)
*G01V 1/26* (2006.01)
*G01V 1/30* (2006.01)
*G01V 1/34* (2006.01)

(52) U.S. Cl. .............................. 367/53; 367/38; 367/50; 367/51; 367/52; 367/73; 702/17; 702/18

(58) Field of Classification Search .................. 367/73, 367/38, 50–53; 702/16–18
See application file for complete search history.

(56) References Cited

U.S. PATENT DOCUMENTS 4,933,913 A 6/1990 Thomsen (Continued)

FOREIGN PATENT DOCUMENTS

EP 1 239 304 A1 9/2002

OTHER PUBLICATIONS

Jones, et al. "3-D prestack depth migration and velocity model building." The Leading Edge, Jul. 1998.*

(Continued)

*Primary Examiner*—Jack Keith
*Assistant Examiner*—Scott A. Hughes
(74) *Attorney, Agent, or Firm*—Meyertons Hood Kivlin Kowert & Goetzel, P.C.; Jeffrey C. Hood; Mark S. Williams

(57) ABSTRACT

System and method for performing anisotropy corrections of post-imaging seismic data for a subsurface formation. The method may receive seismic data, preferably pre-stack seismic data comprising a plurality of traces, e.g., collected from a plurality of source and receiver locations. The seismic data may be imaged/migrated to produce imaged seismic data, which is organized into an arrangement that preserves aspects of the relative seismic propagation angle in the subsurface. One or more anisotropic parameters and corresponding corrections may be determined by analyzing the organized imaged seismic data. The determined parameters or corrections may be used to correct at least a subset of the imaged seismic data, thereby producing corrected seismic data which is useable in analyzing the formation. The corrected data may then optionally be stacked to produce a collection of corrected stacked traces, and/or analyzed as desired. The pre-stack data and/or the corrected seismic data may optionally be displayed.

33 Claims, 10 Drawing Sheets

U.S. PATENT DOCUMENTS

| | | | |
|---|---|---|---|
| 5,128,899 | A | 7/1992 | Boyd et al. |
| 5,596,547 | A * | 1/1997 | Bancroft et al. .............. 367/51 |
| 5,640,368 | A | 6/1997 | Krebs |
| 5,648,939 | A | 7/1997 | Folstad et al. |
| 5,677,893 | A | 10/1997 | de Hoop et al. |
| 5,737,220 | A | 4/1998 | Miller |
| 5,852,588 | A * | 12/1998 | de Hoop et al. .............. 367/38 |
| 6,049,759 | A * | 4/2000 | Etgen .......................... 702/14 |
| 6,067,275 | A * | 5/2000 | Sayers ......................... 367/75 |
| 6,094,400 | A | 7/2000 | Ikelle |
| 6,128,580 | A * | 10/2000 | Thomsen ..................... 702/18 |
| 6,212,477 | B1 | 4/2001 | Zhu et al. |
| 6,292,754 | B1 | 9/2001 | Thomsen |
| 6,470,276 | B1 | 10/2002 | Lansley et al. |
| 6,493,634 | B1 | 12/2002 | Krebs et al. |
| 6,502,038 | B1 | 12/2002 | Lazaratos et al. |
| 6,510,105 | B1 | 1/2003 | Ten Kroode et al. |
| 6,826,484 | B2 * | 11/2004 | Martinez et al. .............. 702/14 |
| 6,864,890 | B2 * | 3/2005 | Meek et al. ................ 345/440 |
| 2002/0010549 | A1 * | 1/2002 | Vinje .......................... 702/14 |
| 2002/0049540 | A1 | 4/2002 | Bevc et al. |

OTHER PUBLICATIONS

Martinez and Lee. "A strategy for anisotropic P-wave prestack imaging." EAGE 64th Conference and Exhibition. May 2002.*

Sun and Martinez. "3D Kirchoff prestack time migration for V(z) and VTI media." EAGE 64th Conference and Exhibition. May 2002.*

Bale, et al. "Prestack depth migration of converted wave data in anisotropic media." 1998 SEG expanded abstracts.*

Prucha, et al. "Angle-domain common image gathers by wave-equation migration." SEG 1999.*

Vestrum. "2D and 3D anisotropic depth migration case histories." CSEG Geophysics 2002.*

Vestrum, Lawton and Schmid. "Imaging Structures Below Dipping TI media." Gephysics, 1999.*

Vestrum and Lawton. "Dip-oriented imaging: Anisotropy and directionality in the prestack domain." 2000 SEG.*

Al-Yahya, Kamal; "Velocity Analysis by Iterative Profile Migration," Geophysics, vol. 54, No. 6, Jun. 1989, Document XP 002030424, pp. 718-729.

Eckhardt, Wietze; "Velocity Model Updating Using Image Gathers," Geophysical Prospecting, vol. 42, No. 5, Jul. 1994, Doucment XP 000619878, pp. 975-986.

Berkhout, A.J., and D. J. Vershuur, "Seismic Imaging Beyond Depth Migration," Geophysics, vol. 66, No. 6, Nov.-Dec. 2001, Document XP 002273247, pp. 1895-1912.

International Search Report, Application No. PCT/US03/35880, Mailed Mar. 29, 2004.

Tariq Alkhalifah; "Velocity analysis using nonhyperbolic moveout in transversely isotropic media"; Geophysics; Nov./Dec. 1997; pp. 1839-1854; vol. 62, No. 6.

Tariq Alkhalifah and Ilya Tsvankik "Velocity analysis for transversely isotropic media"; Geophysics; Sep./Oct. 1995; pp. 1550-1566; vol. 60, No. 5.

George E. Backus; "Long-wave elastic anistrophy produced by horizontal layering"; Journal of Geophysical Research; Oct. 1962; pp. 4427-4440; vol. 67, No. 11.

James Berryman; "Long-wave elastic anistrophy in transversely isotropic media"; Geophysics; May 1979; pp. 896-917; vol. 44, No. 5.

B. Byun, D. Corrigan and J. Gaisler; "Anisotropic velocity analysis for lithology discrimination"; Geophysics; Dec. 1989; pp. 1564-1574; vol. 54, No. 12.

Vladimir Grechka and Ilya Tsvankin; Feasibility of nonhyperbolic moveout inversion in transversely isotropic median; Geophysics; May/Jun. 1998; pp. 957-969; vol. 63, No. 3.

William Harlan; "A convenient approximation of transverse isotropy for higher-order moveout, prestack time migration, and depth calibration"; Retrieved from the Internet: http://billharlan.com/pub/papers/aniso/aniso.html; Aug. 1998; 9 pages.

Moshe Reshef; "Some aspects of interval velocity analysis using 3-D depth-migrated gathers (short note)"; Geophysics; pp. 261-266; vol. 66, No. 1.

Moshe Reshef; "The use of 3-D prestack depth imaging to estimate layer velocities and reflector positions (short note)"; Geophysics; pp. 206-210; vol. 62, No. 1.

Moshe Reshef and Dan Kosloff; "Migration of common-shot gathers"; Geophysics; Feb. 1986; pp. 324-331; vol. 51, No. 2.

Michael Schoenburg and Francis Muir; "A calculus for finely layered anisotropic media"; Geophysics, May 1989; pp. 581-589; vol.54, No. 5.

Leon Thomsen; "Seismic anistropy"; Geophysics; 2001; pp. 40-41; vol. 66, No. 1.

Leon Thomsen; "Weak elastic anisotrop"; Geophysics; Oct. 1986; pp. 1954-1966; vol. 51, No. 10.

Ilya Tsvankin and Leon Thommsen; "Nonhyperbolic reflection moveout in anisotopic media"; Geophysics; pp. 1290-1304; vol. 59, No. 8.

Tariq Alkhalifah; "Seismic DataProcessing in vertically inhomogenous TI media"; Geophysics; Mar./Apr. 1997; pp. 662-675; vol. 62, No. 2.

Pavan Elapavuluri and John C. Bancroft; "Estimation of Thomsen's anisotraphy parameter, delta, using CSP gathers"; Crewes Research Report; 2001; pp. 479-490; vol. 13.

Keith Hawkins, Richard Leggott, Gareth Williams and Herman Kat; "Addressing Anisotropy in 3-D prestack depth migration: A case study from the Southern North Sea"; The Leading Edge; May 2001; 9 pages.

Chengbin Peng and Kurt E. Steenson; "3-D prestack depth migration in anisotropic media: A case study at the Lodgepole reef play in north Dakota"; The Leading edge; 2001.

J. Helen Isaac and Don C. Lawton; "Practical Inversion of anisotropy parameters from surface P-wave seismic data"; CSEG Geophysics Research Project; 2002; 4 pages.

Tariq Alkhalifah; "Kinematics of 3-D DMO operators in transversely isotropic media"; Geophysics; Jul./Aug. 1997; pp. 1214-1219.

Tariq Alkhalifah; "A short tour through the Stanford Exploration Project contributions to anisotrophy"; Stanford Exploration Project, Report 100; Apr. 20, 1999; pp. 361-366.

H.J. Lehmann and W. Houba; "Practical Aspects of the Determination of 3-D Stacking Velocities"; Geophysical Prospecting; 1985; pp. 34-51.

N. A. Anstey and P. Newman; "The Sectional Auto-Correlogram and the Sectional Retro-Correlogram"; Geophysical Prospecting; Dec. 1966; pp. 389-426; vol. 14, No. 4.

* cited by examiner

SEISMIC ANALYSIS USING POST-IMAGING SEISMIC ANISOTROPY CORRECTIONS

CONTINUATION DATA

This application is a continuation of application Ser. No. 10/637,411 titled "Seismic Analysis Using Post-Imaging Seismic Anisotropy Corrections" filed on Aug. 8, 2003 now U.S. Pat. No. 6,904,368 whose inventors were Moshe Reshef and Murray W. Roth, which claimed benefit of priority of U.S. provisional application Ser. No. 60/427,312 titled "Seismic Analysis Using Post-Imaging Seismic Anisotropy Corrections" filed Nov. 12, 2002, whose inventors are Moshe Reshef and Murray W. Roth. Each of the above applications is hereby incorporated by reference in its entirety as though fully and completely set forth herein.

FIELD OF THE INVENTION

The present invention generally relates to seismic exploration, and more particularly, to a system and method for performing anisotropy corrections of post-imaging seismic data.

DESCRIPTION OF THE RELATED ART

Seismic exploration involves the study of underground formations and structures. In seismic exploration, one or more sources of seismic energy emit waves into a region of interest, such as a formation. These waves enter the formation and may be scattered, e.g., by reflection or refraction. One or more receivers sample or measure the reflected waves, and the resultant data recorded. The recorded samples may be referred to as seismic data or a "seismic trace". The seismic data contain information regarding the geological structure and properties of the region being explored. The seismic data may be analyzed to extract details of the structure and properties of the region of the earth being explored.

In general, the purpose of seismic exploration is to map or image a portion of the subsurface of the earth (a formation) by transmitting energy down into the ground and recording the "reflections" or "echoes" that return from the rock layers below. The energy transmitted into the formation is typically sound energy. The downward-propagating sound energy may originate from various sources, such as explosions or seismic vibrators on land, or air guns in marine environments. Seismic exploration typically uses one or more sources and typically a large number of sensors or detectors. The sensors that may be used to detect the returning seismic energy are usually geophones (land surveys) or hydrophones (marine surveys).

During seismic exploration (also called a seismic survey), the energy source may be positioned at one or more locations near the surface of the earth above a geologic structure or formation of interest. Each time the source is activated, the source generates a seismic signal that travels downward through the earth and is at least partially reflected. The seismic signals are partially reflected from discontinuities of various types in the subsurface, including reflections from "rock layer" boundaries. In general, a partial reflection of the seismic signals may occur each time there is a change in the elastic properties of the subsurface materials. The reflected seismic signals are transmitted back to the surface of the earth, where they are recorded as a function of travel time. The reflected seismic signals are recorded typically at a number of locations at or near the surface. The recorded returning signals are digitized and recorded as a function of time (amplitude vs. time).

Seismic data are the result of recording the acoustic energy that has been reflected from discontinuities in the subsurface. The digital samples that make up the recording are usually acquired at equal intervals in time. In addition, each sample in a conventional digital seismic trace is associated with a travel time. Where the source and receiver are both located on the surface, the samples of reflected energy have a two-way travel time from the source to the reflector and back to the surface again.

In general, the surface location of every trace in a seismic survey is tracked and is made a part of the trace itself (as part of the trace header information). This allows the seismic information contained within the traces to be later correlated with specific surface and subsurface locations, thereby providing a means for posting and contouring seismic data—and attributes extracted therefrom—on a map (i.e., "mapping").

Multiple source activation/recording combinations may be combined to create a near continuous profile of the subsurface that can extend over a large area. In a two-dimensional (2D) seismic survey, the recording locations are generally laid out along a single line. In a three dimensional (3D) survey the recording locations are typically distributed across the surface in a grid pattern. In a "raw" or "preprocessing" form, a "pre-stack" seismic trace will exist for every pair of source and receiver locations. The general goal of seismic processing is to transform the acquired seismic data into a form that is useful for some aspect of seismic interpretation such as, but not limited to, structural and/or stratigraphic inference of the subsurface geology, lithology and/or fluid estimation for potential subsurface hydrocarbon reservoirs, and more. Seismic processing techniques and seismic data organization will generally depend upon the final interpretation objectives, the quality of the seismic data, the complexity of the subsurface and many other factors.

A simple output product from the seismic processing procedure is "stacked" seismic data, referred to as the stacked section, which is generated by combining multiple pre-stack seismic traces, based upon some form of implied redundancy. Seismic data in a given seismic survey may be stacked according to various criteria such as, but not limited to: all or some seismic traces with the same or similar source-receiver midpoint; all or some seismic traces with the same or similar subsurface "image location", all or some seismic traces with the same source location; all or some seismic traces with the same source-receiver "offset" distance; and more. The stacking process has advantages such as, but not limited to: reducing data volume and exploiting data redundancy to improve signal-to-noise quality of data. The stacking process also results in the loss of certain information that cannot be recovered from the stacked data, so the stacking process is used selectively in accordance with issues such as, but not limited to, the interpretation objectives of the seismic survey.

The most common stacked output of a seismic processing procedure has historically been a stack of seismic traces according to common source-receiver midpoint, common subsurface imaging location, or some similar organization. In simplest terms, such a stacked 2D seismic line can be thought of as providing a cross sectional picture (vertical slice) of the earth layers as they exist directly beneath the recording locations. Such a stacked 3D survey produces a data "cube" or volume that is, at least conceptually, a 3D picture of the subsurface that lies beneath the survey area. In reality, both 2D and 3D surveys interrogate some volume of earth lying beneath the area covered by the survey.

The data in a stacked 3D survey are amenable to viewing in a number of different ways. First, horizontal "constant time slices" may be extracted from a stacked seismic volume by collecting all of the digital samples that occur at the same travel time. This operation results in a horizontal 2D plane of seismic data. By animating a series of 2D planes it is possible for the interpreter to pan through the volume, giving the impression that successive layers are being stripped away so that the information that lies underneath may be observed. Similarly, a vertical plane of seismic data may be taken at an arbitrary azimuth through the 3D volume by collecting and displaying the seismic traces that lie along the path of selected azimuth. This operation, in effect, extracts an individual 2D seismic line from within the 3D data volume. More sophisticated visualization techniques include, but are not limited to: 3D "probes" of combined vertical and horizontal planes that can be arbitrary moved through the seismic volume; and 3D rendered volumes of arbitrary size and shape, among others.

The data recorded by each receiver is a time series representing reflections from the subsurface caused by a signal source at the surface of the Earth. This time series is known as a trace. The behavior of these traces is governed by the wave equation, as is well known in the art. It is known that by using the redundancy that is built into the method of data acquisition, the wave equation can be used to predict the speed at which the sound waves propagate through the Earth's surface. The wave equation predicts the dissipation of energy as a function of the known velocities of geological formations in the x, y, and z directions as the waves propagate through the Earth. After a large amount of data, in the form of seismic traces, is collected, it is processed. The gathering of seismic traces into organizations of common source location, common source-receiver midpoint, common image point, and other organizations, represents an important characteristic of seismic data handling. Such organizations and changes of organizations of seismic traces are a common facet of the seismic processing procedure. Following processing of the traces to eliminate noise, improve resolution, align data, or other procedures, a stacking process may be performed in which traces are summed together into two-dimensional or three-dimensional arrays of numbers comprising the amplitudes of reflected seismic waves recorded over a period of time.

It is well known that the Earth's subsurface can be imaged by a seismic survey. In a seismic survey, elastic waves generated at or near the surface of the Earth are injected into the Earth's subsurface by various means such as a large vibrating vehicle (Vibrosies), in the case of a land-based survey, or an air gun, in the case of a marine survey, among others. As the waves travel through the Earth, subsurface changes in the geological composition of the Earth cause the waves to reflect and propagate toward the surface. When the reflected waves reach the surface, they are recorded by a number of receivers. The receivers may be positioned at locations at or near the Earth's surface, towed behind seismic boats in the form of a very long cable made up of hydrophones or be otherwise deployed in a manner that detects seismic energy. The data recorded by the receivers are processed to produce an image of the geological subsurface of the earth.

Seismic data that have been properly acquired and processed can provide a wealth of information to the explorationist, who is one of the individuals within an oil company whose job it is to identify potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. During the computer processing of the seismic survey data, estimates of subsurface rock velocities are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets.

A number of seismic processing techniques may be used to analyze the seismic data, including pre-stack imaging (which may include data migration) and normal moveout, among others.

Data migration is the reconstruction of an image or map of the Earth's subsurface from the seismic data in the time domain as recorded by the seismic receivers at or near the Earth's surface. Data migration converts the data from the recorded time domain to an image-point domain in time (time imaging) or depth (depth imaging). The data that exist in the recorded time domain are generally mispositioned both laterally and vertically. Migration converts these mispositioned data to data representing lateral and vertical (depth and/or time) positions of geological structures. Thus, migration refers to the movement of the lateral, depth, and/or time positions of seismic data from the location where the data are recorded to the location where the subsurface reflection originates.

Data migration may be applied to stacked or pre-stack seismic data from 2D or 3D seismic surveys. Pre-stack migration comprises taking seismic traces, generally organized in common shot, common offset, or other useful ordering, and mapping the seismic energy to an image-point domain in time or depth. The organization of the seismic traces and the associated source field assumptions are important characteristics of pre-stack migration. There are several pre-stack migration types, including, but not limited to:

(1) shotpoint migration: the source field is the vibrating state generated by the shotpoint and the reflection data are the response of the subsurface to this source field;

(2) plane wave migration, also called common illumination angle migration: the source field is the plane wave considered and the reflection data are the response of the subsurface to this source field; and (3) offset migration: the source field is the one emitted by a shotpoint and the reflection data are the records obtained by the pickup(s) associated with this shotpoint having the offset considered; in such a migration, migration of the data associated with an offset requires as many wave propagation and retropropagation modelings as there are shotpoints and stacking of the results obtained for each shotpoint.

While the output of pre-stack migration may be summed to create stack sections during the migration process, the output of pre-stack migration is often output to pre-stack gathers of common image-point, common-offset, or other useful organization. By retaining the pre-stack migrated seismic data in an unstacked form, additional seismic processing may be applied to the data.

Kirchoff migration, applied to seismic traces in the shot, plane wave, offset, or other domain, is a commonly used migration algorithm for 2-D/3-D pre-stack depth/time migration. The Kirchoff integral is based upon a high frequency approximation of the wavefield and is based upon associated traveltime computations generated with ray-tracing and other estimation techniques. Wave equation migration techniques are typically more robust than Kirchoff migration techniques, but are also typically more computationally intensive. A wave equation migration technique may use a priori knowledge of the value of the seismic energy at a known depth, e.g., on the surface, and a model of the distribution of the wave propagation velocities in the zone. Pre-stack wave equation migration uses this knowledge to model the propagation of the source field and the propagation of the recorded reflection data. This information may be used to determine phase coherences between these two modeled fields, and hence to determine locations where subsurface reflections originate.

Many types of implementations of Kirchoff, wave equation and other types of pre-stack migration exist. In general, the action of a migration technique on seismic trace data is governed by some representation of subsurface velocities. This representation of subsurface velocities is generally known as a "velocity model". A velocity model is an estimation of the velocity of propagation for the seismic waves that are being migrated. Velocity models may be constructed in order to migrate various types of elastic waves, such as, but not limited to, pressure or p-waves, shear or s-waves and "mode-converted" waves. Regardless of the type of elastic waves being migrated, a common assumption is that the elastic wave will propagate through the subsurface with the same velocity, independent of propagation direction, which is known as an "isotropic" assumption.

Subsurface rock formations rarely, if ever, exhibit isotropic characteristics—that is, exactly the same rock parameters in all directions. This being the case, seismic waves propagating through an "anisotropic subsurface", where velocity of propagation depends upon propagation angle, will encounter different elastic rock properties, depending upon the angle or often the azimuth of wave propagation through the subsurface. As a consequence, traditional seismic processing, which is based upon an isotropic subsurface assumption, will not properly "correct" for properties like seismic travel times during operations like normal moveout and pre-stack imaging. With multi-trace pre-stack seismic data, the effect will be to both misposition events in the vertical and horizontal orientations and to degrade the stacking power for normal moveout corrected or migrated gathers.

Thomsen (1986) identified a set of elastic parameters which could be included in traditional seismic processing algorithms to accommodate a vertical transverse isotropic (VTI) subsurface assumption (vertical different from horizontal—but no azimuthal difference in the horizontal). These Thomsen parameters are key to defining certain anisotropic effects, and include: epsilon, a relationship between Vz (vertical wave velocity) and Vx (horizontal wave velocity); and delta, a relationship between Vz and Vn (normal moveout velocity). Other representations of anisotropic effects have been characterized by Alkhalifah (1999) and others.

Anisotropic parameters, such as the Thomsen parameters, are difficult to estimate, as they require relative measurements of seismic waves reflecting from both "flat" and "dipping" rock formations for approximately the same traveltime (Alkhalifah 1997). Traditional seismic processing approaches, including analysis of common midpoint gathers, have a difficult time separating energy reflected from flat and dipping rock formations at coincident times. However, if Thomsen parameters can be determined or estimated, corrections can be applied as part of seismic processing algorithms like normal moveout or pre-stack imaging (Harlan 1998, Sun and Martinez 2002, Hawkins et al 2001, Tsvankin and Thomsen 1994, etc.). Typically, estimates of Thomsen parameters are made using pre-stack seismic gathers, often coupled with semblance analysis or other visual/mathematic coherence measure (Alkhalifah 1997, Alkahalifah and Tsvankin 1995, Byun et al 1989, Elapavuluri and Bancroft 2001, Peng and Steenson 1999). Alternative approaches are to apply multiple pre-stack migrations, with anisotropy corrections, using variations of Thomsen parameters (Martinez and Lee 2002), or to attempt post-imaging inversion estimation (Issac and Lawton 2002). As pre-stack migration can take days or even weeks to perform, techniques that employ multiple migrations or otherwise require additional application of pre-stack migration can be very costly.

SUMMARY OF THE INVENTION

Various embodiments of a system and method for performing anisotropy corrections of post-imaging seismic data exist. Seismic data may be received, where the seismic data is preferably pre-stack seismic data, where the pre-stack data includes a plurality of seismic traces. In one embodiment, the seismic data may be collected from a plurality of receiver locations, e.g., the seismic data may be received directly from the receivers via wired or wireless network, satellite, telephone, delivered storage medium, or any other means of transfer. In one embodiment, the method may utilize one or more source locations for generating energy into the earth, i.e., into a formation. The plurality of receiver locations may then receive the reflected energy. Alternatively, the seismic data may be collected and sent to an intermediate system, e.g., an intermediate computer system, then received from the intermediate system, e.g., via a network, and stored on a storage medium.

The seismic data may be migrated to produce imaged data. In other words, pre-stack imaging may be performed on the received seismic data, where a migration operation, also referred to as an imaging process, may be used to generate common image gathers (CIGs). In various embodiments, the seismic data may be migrated in a 2D and/or 3D sense with a choice of pre-stack time or depth imaging algorithms, such as shot-domain 3D Kirchoff data migration, among others. Any of various 2D and/or 3D migration techniques may be used. It should also be noted that this approach is applicable to more than just "traditional" seismic analysis techniques, and is extendable to mode-converted, multi-component, 4-D seismic, vertical seismic profiles, cross-well tomography, or any other seismic-based analysis technique.

The imaged seismic data that are output from the imaging process may be organized into an arrangement that preserves aspects of the relative seismic propagation angle in the subsurface. Said another way, the method may migrate the seismic data to seismic gathers, i.e., common image gathers (CIGs), that preserve angles, where migrated trace samples that correspond to the same angle or image offset are summed into a resultant image gather trace. These common image gathers may also be referred to as common angle gathers (CAGs), in that "angle gather" is a more general term denoting organization of the seismic data according to propagation angle or reflection angle. In a preferred embodiment, the output imaged seismic data may be ordered by the total source-to-common surface location distance plus the common surface location-to-receiver distance (i.e., the image offset), where common surface location (CSL) is the surface spatial location corresponding to the subsurface image or reflection point (CIP/CRP), and where image offset is a simplification of rigorous angle ordering.

It is also noted that in other embodiments, the approach described herein may be performed using relative 3-D travelpath distances. In other words, rather than using the source-to-common surface location distance plus common surface location-to-receiver distance for the offset, the method may use the sum of source-to-common-image-location (at depth) plus common-image-location-to-receiver distance for the offset, thereby ordering the gather traces by total travelpath distance, rather than the surface projection of the two travelpath segments (the source-to-common surface location distance and the common surface location-to-receiver distance).

Estimates of one or more correction parameters may then be determined from the image gathers produced above. In a preferred embodiment, the method estimates one or more anisotropic parameters, e.g., Thomsen anisotropy parameters, based on the image gathers. In various embodiments, the image gathers, angle gathers, or other similar output arrangement may be analyzed for anisotropic effects to determine the anisotropic parameters.

Analysis for anisotropic effects may be performed in a variety of ways. For example, post imaging "residual" anisotropic corrections may be mathematically calculated for single or various anisotropic parameters. The simplest form of these corrections will typically take the form of spatially varying vertical corrections. More sophisticated corrections which also include horizontal corrections may also be applied. Vertical and/or horizontal anisotropy corrections may be applied independently or may be applied in combined radial corrections. Other sophisticated anisotropic corrections may be employed that will not only map seismic data within image gathers, but may also map seismic data to other image gathers. Other anisotropic corrections may be employed that adjust for amplitude, phase or other seismic characteristics. These corrections may be applied to the image offset gathers being analyzed in a number of ways, such as, for example, interactive corrections, or static application to multiple copies of the image offset gather, among others.

Through simple analytical, ray-tracing or other approaches, vertical, horizontal, radial, spatial or any combination of corrections can be estimated for every point on the image gathers, corresponding to a given set of Thomsen or other anisotropic parameters. Consequently, various approaches may be used to estimate the Thomsen parameters or other anisotropic parameters, such as, for example, by correcting the image gathers for many combinations of anisotropic parameters and selecting the "flattest" events, regardless of dip, thereby identifying the corresponding anisotropic parameters for output or storage. Alternatively, semblance or other types of similarity scans or coherency transforms of the image offset gathers may be created to determine the most "coherent" event corrections and therefore the best parameter values, in other words, to estimate the amount of anisotropic effects in the data. Another approach, due to the simple nature of the corrections, is to "interactively" correct the image gathers for various anisotropic parameters, essentially "tuning" the image gathers to the flattest state. In other words, a user may iteratively "tweak" the parameters, e.g., using a computer-implemented software tool, viewing the results on a display, and outputting or storing the resultant parameter values once the image gathers are sufficiently flat, e.g., (substantially) optimally corrected. In one embodiment, the analysis may include animating, e.g., visually alternating, between statically and/or dynamically corrected versions of the image offset gather. Well log information may be used in certain embodiments to aid in the selection of anisotropic parameters. In addition to "kinematic" adjustments, that affect position of seismic energy, anisotropic corrections may also account for amplitude, phase or other seismic propagation characteristics.

This approach can also be extended to other forms of pre-stack gathers and migration approaches that separate data in some manner related to relative horizontal travelpath such as plane wave migration and angle gathers. Regardless of which analysis technique is used, the analysis performed above produces an estimate of one or more anisotropic parameters.

The calculated anisotropic parameters may then be applied to at least a subset of the pre-stack seismic data. The calculated anisotropic parameters may be applied to all or any subset of the pre-stack seismic data in various ways. One option is to perform another imaging operation, in this case correcting for anisotropic effects. In a preferred embodiment, corrections may be applied as vertical, horizontal, radial, spatial or other combination of shifts to individual traces output from the pre-stack imaging operation. More sophisticated techniques, such as, for example, a "residual imaging operation" or other transformation of the data may also be used to achieve the desired correction, and may include amplitude, phase or other seismic character correction. After the corrections have been applied, the traces may be accessed as image offset gathers, common image offset gathers, or various other ensemble arrangements, as desired.

In one embodiment, once the anisotropic parameters are determined, the pre-stack imaging process may be repeated using a seismic processing algorithm modified to account for at least vertical transverse isotropic (VTI) assumptions. Alternatively, the relative vertical, horizontal, radial, spatial or other combination of shifts and/or amplitude, phase or other anisotropic corrections may be applied to any or every image gather, providing an alternative to a full re-imaging operation. After the image gathers are corrected, common image gather stacks may produce images with seismic energy positioned more accurately than data with no anisotropic corrections. It is noted that amplitude vs. angle (AVA), amplitude vs. offset (AVO), pre-stack inversion, and many other pre-stack analysis techniques may produce more accurate results using these corrected gathers.

It is further noted that this technique is applicable to 2-D, 3-D, 4-D, vertical seismic profile (VSP), or tomographic seismic data of p-wave, converted-wave or s-wave energy, being imaged with pre-stack time or depth imaging approaches, among others.

Once the seismic data have been corrected using the determined anisotropic parameters, the corrected seismic data may be processed or analyzed as desired to characterize or analyze the formation of interest. For example:

In one embodiment, any or all of the (corrected) seismic data associated with individual image locations may optionally be stacked (or added together) to produce a collection of stacked traces. The collection of stacked traces may represent a more accurate subsurface image than "traditional" imaging workflows that do not include anisotropic corrections.

Alternatively, the corrected seismic data may optionally be analyzed or transformed using any of various techniques, including but not limited to, AVA, AVO, pre-stack inversion, and so forth, as noted above.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
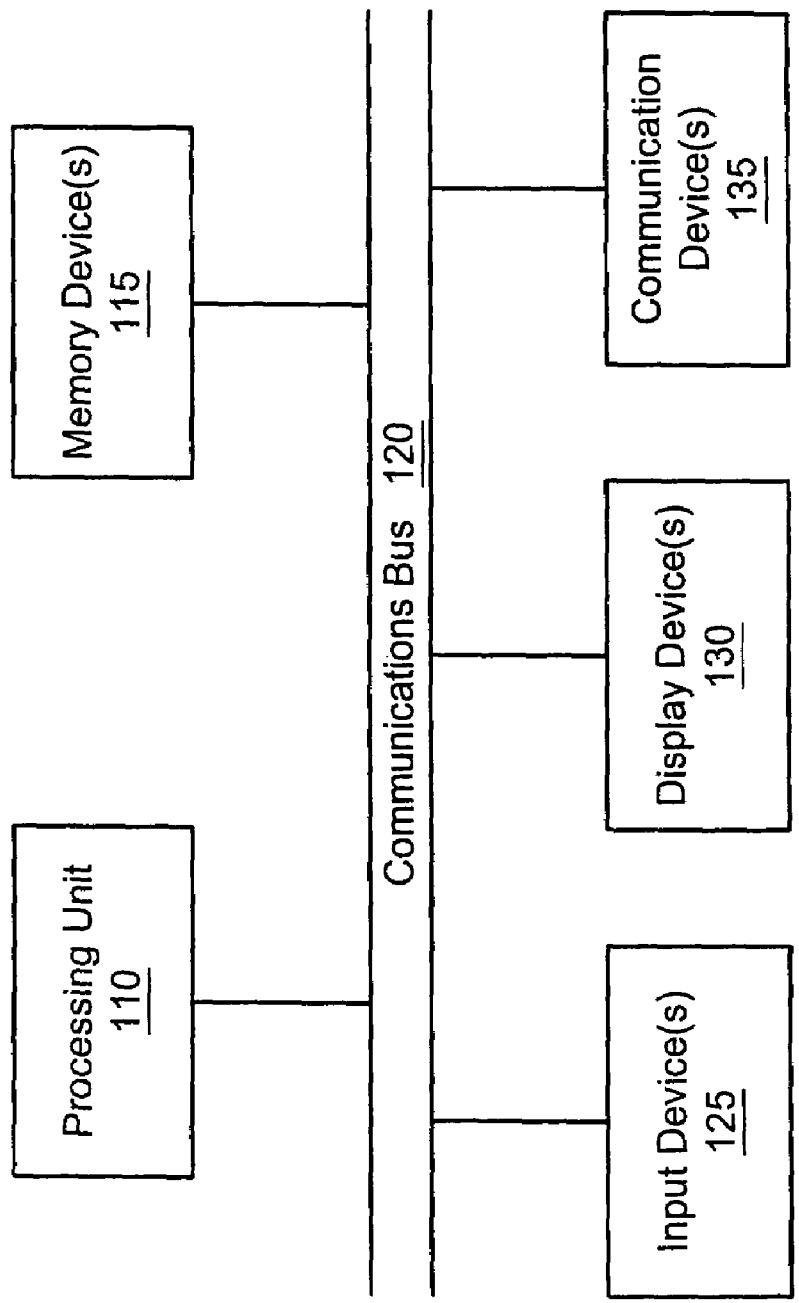
FIG. 1 illustrates one embodiment of a system 100 for analyzing seismic data.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to".

DETAILED DESCRIPTION OF THE EMBODIMENTS

Reshef (1996) described a unique output domain for seismic imaging, applicable to 2D or 3D data and time or depth imaging. In these gathers, referred to herein as "image offset gathers", being a special form of image gather, where the "traditional" source-to-receiver offset distance for the horizontal axis is replaced with a value of source-to-common-surface-location (CSL) distance plus common-surface-location-to-receiver distance. Common surface location (CSL) is the surface spatial location corresponding to the subsurface image or reflection point (CIP/CRP) of an image gather. Reshef noted specific advantageous characteristics of these gathers, such as separating energy reflected from "flat" and from "dipping" rock formations. Specifically, energy from "flat" subsurface reflectors tends to collect on the "near" traces (smaller shot-image-receiver distance), while energy from more and more steeply dipping subsurface reflectors, i.e., "dipping energy", tends to collect on further image offset traces, as will be illustrated and described below with reference to FIG. 5.

The characteristics of these "image offset gathers" make it possible to separate energy from "flat" and "dipping" rock formations, after a pre-stack imaging correction, i.e., migration, whether 2D or 3D or time or depth. Furthermore, since anisotropic effects are related to angle of subsurface propagation, these image offset gathers also have the effect of isolating seismic energy requiring different anisotropic corrections. As a consequence, these image gathers represent a powerful tool for estimating the Thomsen or other anisotropic parameters and corrections.

While the description focuses upon the estimation of Thomsen anisotropic parameters for vertical transverse isotropic (VTI) corrections, the approach is broadly applicable to general anisotropic corrections, as well. In the most general sense, the approach described herein is extendable to earth property effects that are dependent upon differing vertical and horizontal propagation characteristics. For example, this approach may also be applied to inelastic attenuation corrections.

FIG. 1—Computer-Based Analysis System

FIG. 1 illustrates a system 100 for analyzing seismic data according to one set of embodiments of the invention. System 100 may include a processing unit 110, a collection of memory devices 115, a communication bus 120, a set of input devices 125, and one or more display devices 130. The collection of memory devices 115 may include any of various forms of memory media and memory access devices. For example, memory devices 115 may include semiconductor RAM and ROM devices as well as mass storage devices such as CD-ROM drives, magnetic disk drives, and magnetic tape drives.

Processing unit 110 is configured to read and execute program instructions, e.g., program instructions provided on a memory medium such as a set of one or more CD-ROMs, and loaded into semiconductor memory at execution time. Processing unit 110 may couple to memory devices 115 through communication bus 120 (or through a collection of busses). In response to the program instructions, processing unit 110 may operate on seismic data stored in one or more of the memory devices 115. Processing unit 110 may include one or more programmable processors (e.g., microprocessors).

One or more users may supply input to the system 100 through the set of input devices 125. Input devices 125 may include devices such as keyboards, mouse devices, digitizing pads, track balls, light pens, data gloves, eye orientation sensors, head orientation sensors, etc. The set of display devices 130 may include devices such as monitors, projectors, head-mounted displays, printers, plotters, etc.

In one embodiment, system 100 may include one or more communication devices 135, e.g., a network interface card for interfacing with a computer network. For example, seismic data gathered at a remote site may be transmitted to the system 100 through a computer network. The system 100 may receive the seismic data from the computer network using the network interface card. In other embodiments, the system 100 may include a plurality of computers and/or other components coupled over the computer network, where storage and/or computation implementing embodiments of the present may be distributed over the computers (and/or components) as desired.

Figure 2:
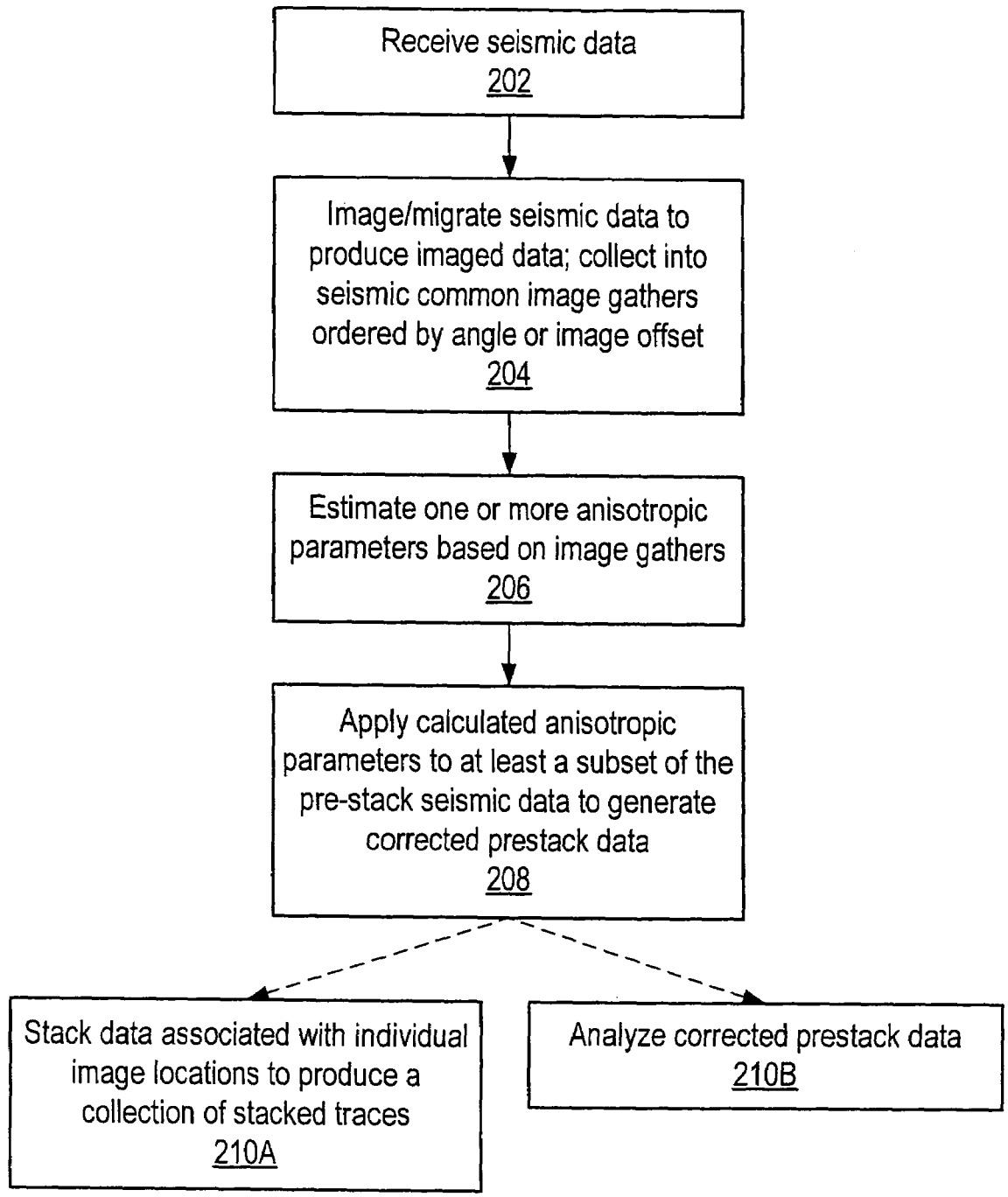
FIG. 2 is a flowchart diagram illustrating a method for analyzing seismic data according to one embodiment of the invention.

FIG. 2—Method for Analyzing Seismic Data

FIG. 2 is a flowchart diagram illustrating a method for analyzing seismic data, according to one embodiment of the invention. It is noted that in various embodiments, some of the steps described may be performed concurrently, in a different order than shown, or omitted. Additional steps may also be performed as desired.

As FIG. 2 shows, in 202, seismic data may be received. The received seismic data preferably is pre-stack seismic data, where the pre-stack data includes a plurality of (pre-stack) seismic traces. In one embodiment, the seismic data may be collected from a plurality of receiver locations. For example, the seismic data may be received directly from the receivers, e.g., via wired or wireless network, satellite, telephone, delivered storage medium, or any other means of transfer. In one embodiment, the method may utilize one or more source locations for generating energy into the earth, i.e., into a formation. The plurality of receiver locations may then receive the reflected energy.

Alternatively, the seismic data may be collected and sent to an intermediate system, e.g., an intermediate computer system, then received from the intermediate system, e.g., via a network, and stored on a storage medium, such as in the collection of memory devices 115 of system 100, described above.

Is should be noted that the received seismic data may be obtained in any of a variety of ways. For example, the seismic data may be obtained from a p-wave seismic survey, an s-wave seismic survey, a mode-converted seismic survey, a Vertical Seismic Profile seismic survey, or from a surface or subsurface seismic tomography survey, among others.

In 204, the seismic data may be migrated to produce imaged data. In other words, pre-stack imaging may be performed on the received seismic data, where an image offset migration, also referred to as an imaging process, may be used to generate common image gathers (CIGs). In various embodiments, the seismic data may be migrated in a 2D and/or 3D sense with a choice of pre-stack time or depth imaging algorithms, such as shot-domain 3D Kirchoff data migration, among others. Any of various 2D and/or 3D migration techniques may be used. It should also be noted that this approach is applicable to more than just "traditional" seismic analysis techniques, and is extendable to mode-converted multi-component, 4-D seismic, vertical seismic profiles, cross-well tomography, or any other seismic-based analysis technique.

The imaged seismic data that are output from the imaging process may be organized into an arrangement that preserves aspects of the relative seismic propagation angle in the subsurface, e.g., by ordering the seismic common image gathers by angle or image offset. Said another way, the method may migrate the seismic data to seismic gathers, i.e., common image gathers (CIGs), that preserve angles, where migrated trace samples that correspond to the same angle or image offset are summed into a resultant image gather trace. These common image gathers may also be referred to as common angle gathers (CAGs), in that "angle gather" is a more general term denoting organization of the seismic data according to propagation angle or reflection angle. In a preferred embodiment, the output imaged seismic data may be organized or ordered by the total source-to-common surface location distance plus the common surface location-to-receiver distance (i.e., the image offset), which is a simplification of rigorous angle ordering, although other organizations of the data are also contemplated. For example, the organizing may include ordering the imaged seismic data by a total source-to-image point plus image point-to-receiver distance, ordering the imaged seismic data by incidence or reflection angle, or ordering the imaged seismic data by a representation of estimated reflector dip, among other ordering schemes.

It is also noted that in other embodiments, the approach described herein may be performed using relative 3-D travelpath distances. In other words, rather than using the source-to-common surface location distance plus common surface location-to-receiver distance for the offset, the method may use the sum of source-to-common-image-location (at depth), plus common-image-location-to-receiver distance for the offset, thereby ordering the gather traces by total travelpath distance, rather than the surface projection of the two travelpath segments (the source-to-common surface location distance and the common surface location-to-receiver distance). It is noted that the common-image-location may also be referred to as the "image point".

In 206, estimates of one or more correction parameters may be determined from the image gathers produced in 204. In a preferred embodiment, the method estimates one or more anisotropic parameters, e.g., Thomsen anisotropy parameters, based on the image gathers produced in 204. In various embodiments of 206, the image gathers, angle gathers, or other similar output arrangement may be analyzed for anisotropic effects to determine the anisotropic parameters.

Analysis for anisotropic effects may be performed in a variety of ways. For example, post imaging "residual" anisotropic corrections may be mathematically calculated for single or various anisotropic parameters. The simplest form of these corrections will typically take the form of spatially varying vertical corrections. More sophisticated corrections which also include horizontal corrections may also be applied. Vertical and/or horizontal anisotropy corrections may be applied independently or may be applied in combined radial corrections. Other sophisticated anisotropic corrections may be employed that will not only map seismic data within image gathers, but may also map seismic data to other image gathers. These corrections may be applied to the image offset gather being analyzed in a number of ways, such as, for example, interactive corrections, or static application to multiple copies of the image offset gather, among others.

The one or more anisotropic parameters may be determined in a number of different ways, including, for example, analyzing the organized imaged seismic data to determine the one or more anisotropic parameters, analyzing the organized imaged seismic data for anisotropic effects, and analyzing the organized imaged seismic data for anisotropic corrections, among others.

Through simple analytical, ray-tracing or other approaches, vertical, horizontal, radial, spatial or any combination of corrections can be estimated for every point on the image gathers, corresponding to a given set of Thomsen or other anisotropic parameters. Consequently, various approaches may be used to estimate the Thomsen parameters or other anisotropic parameters, such as, for example, by correcting the image gathers for many combinations of anisotropic parameters and selecting the "flattest" events, regardless of dip, thereby identifying the corresponding anisotropic parameters for output or storage.

Alternatively, semblance or other types of similarity scans or coherency transforms of the image offset gathers may be created to determine the most "coherent" event corrections and therefore the best parameter values, in other words, to estimate the amount of anisotropic effects in the data. Another approach, due to the simple nature of the corrections, is to "interactively" correct the image gathers for various anisotropic parameters, essentially "tuning" the image gathers to the flattest state. In other words, a user may iteratively "tweak" the parameters, e.g., using a computer-implemented software tool, viewing the results on a display, and outputting or storing the resultant parameter values once the image gathers are sufficiently flat, e.g., (substantially) optimally corrected. In one embodiment, the analysis may include animating, e.g., visually alternating, between statically and/or dynamically corrected versions of the image offset gather. Well log information may be used in certain embodiments to aid in the selection of anisotropic parameters.

Thus, regardless of the specific technique employed, image offset gathers provide a means to estimate the anisotropic parameters. This approach can also be extended to other forms of pre-stack gathers and migration approaches that separate data in some manner related to relative horizontal travelpath such as plane wave migration and angle gathers. Regardless of which analysis technique is used, the analysis performed in step 206 produces an estimate of one or more anisotropic correction parameters.

In 208, the calculated anisotropic correction parameters can be applied to at least a subset of the pre-stack seismic data. The calculated anisotropic correction parameters may be applied to all or any subset of the pre-stack seismic data in various ways. One option is to perform another imaging operation, in this case correcting for anisotropic effects. In a preferred embodiment, corrections may be applied as vertical, horizontal, radial, spatial or other combination of shifts to individual traces output from the pre-stack imaging operation. More sophisticated techniques, such as, for example, a "residual imaging operation" or other transformation of the data may also be used to achieve the desired correction.

Thus, in various embodiments, applying the anisotropic correction parameters to at least a subset of the imaged seismic data may include one or more of applying vertical and/or horizontal mapping shifts to the seismic data, applying radial mapping shifts to the seismic data, mapping the seismic data across spatial image locations, making amplitude, phase, or frequency adjustments to the seismic data, re-imaging the received seismic data using the determined one or more anisotropic parameters, and applying a residual migration mapping operation to the seismic data, among others. After the corrections have been applied, the traces may be accessed as image offset gathers, common image offset gathers, or various other ensemble arrangements, as desired.

In one embodiment, once the anisotropic correction parameters are determined in 206, the pre-stack imaging process of 204 may be repeated using a seismic processing algorithm modified to account for at least vertical transverse isotropic (VTI) assumptions. Alternatively, the relative vertical, horizontal, radial, spatial or other combination of shifts and/or amplitude, phase or other anisotropic corrections may be applied to any or every image gather, providing an alternative to a full re-imaging operation. After the image gathers are corrected, common image gather stacks may produce images with seismic energy positioned more accurately than data with no anisotropic corrections. It is noted that amplitude vs. angle (AVA), amplitude vs. offset (AVO), pre-stack inversion, and many other pre-stack analysis techniques may produce more accurate results using these corrected gathers.

It is further noted that this technique is applicable to 2-D, 3-D, 4-D, vertical seismic profile (VSP), or tomographic seismic data of p-wave, converted-wave or s-wave energy, being imaged with pre-stack time or depth imaging approaches, among others.

Once the seismic data have been corrected using the determined anisotropic correction parameters, the corrected seismic data may be processed or analyzed as desired to characterize or analyze the formation of interest. For example:

In 210A, the method may optionally include stacking (or adding together) any or all of the (corrected) seismic data associated with individual image locations to produce a collection of corrected stacked traces. The collection of corrected stacked traces may represent a more accurate subsurface image than "traditional" imaging workflows that do not include anisotropic corrections, and thus may be useable in analyzing the formation.

Alternatively, as indicated in 210B, the method may optionally include analyzing the corrected seismic data using any of various techniques, including but not limited to, AVA, AVO, pre-stack inversion, additional seismic processing and so forth, as noted above, to produce seismic analysis results, wherein the seismic analysis results are useable in analyzing the formation. For example, in various embodiments, analyzing the corrected seismic data may include one or more of: amplitude vs. angle (AVA) analysis, amplitude vs. offset (AVO) analysis, lithology and fluid estimation, and pre-stack inversion, among others. Thus, in one embodiment, additional seismic processing may be applied after applying the anisotropic parameters.

In one embodiment, a representation of the corrected stacked traces may be provided to a display device for user observation. For example, in one embodiment, the corrected seismic data includes corrected pre-stack seismic traces, where, for example, a representation of the corrected pre-stack seismic traces may be provided to a display device for user observation.

Figure 3:
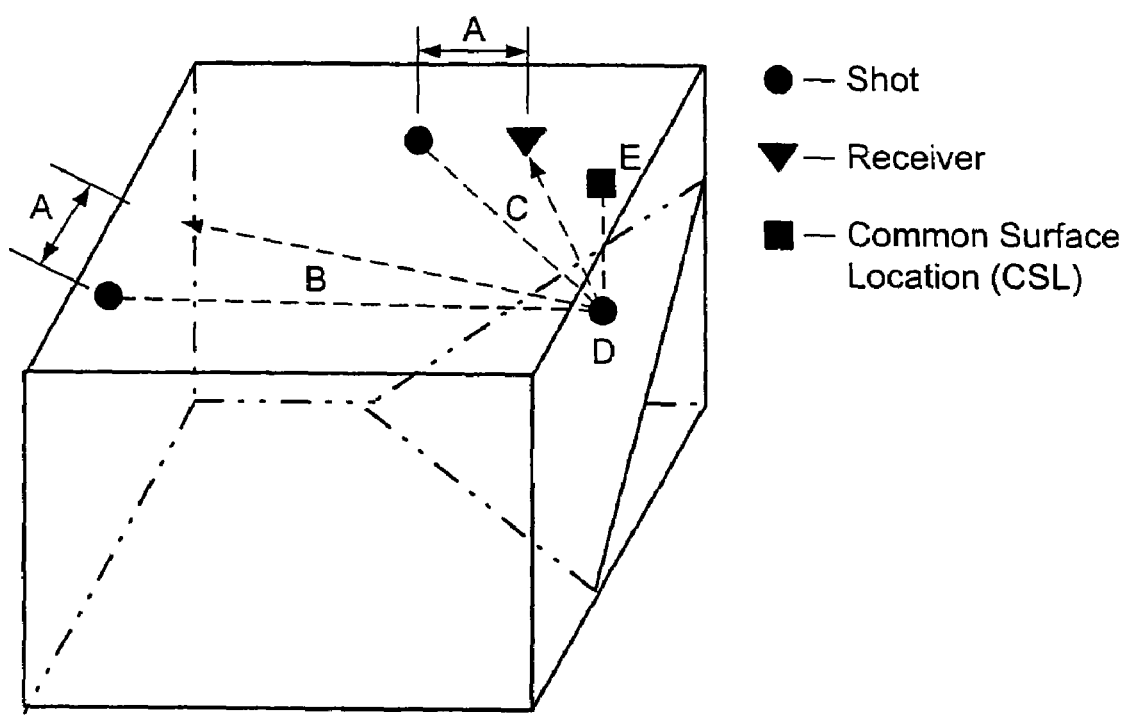
FIG. 3 illustrates the difference between an image offset and traditional source-receiver offset, according to one embodiment.

FIG. 3—Comparison of Source-Receiver Offset and Image Offset

FIG. 3 illustrates the difference between an image gather ordered by image offset and a traditional source-receiver offset. Note that in each case, a respective source (shot), denoted by a black circle, sends energy (dashed line) that impinges and reflects from a dipping reflector D, then is received by a respective receiver, denoted by a black triangle. As shown, the "traditional" source receiver offset distance, A, is identical for both travel paths. However the image offsets, corresponding to the source-to-CSL-to-receiver distance, are approximately twice B and twice C, respectively. As mentioned above, the image offset used is preferably the sum of the surface-projected travel paths, i.e., the surface distance from source-to-CSL-to-receiver, although in other embodiments, the full 3-D path distance may be used.

Thus, by using the source-to-CSL-to-receiver distance to order image gather traces instead of the traditional source-receiver distance, the resulting image gather traces will sum differently, resulting in dip or angle dependent distribution of signal energy. This effect is illustrated in FIGS. 4 and 5, described below.

Figure 4:
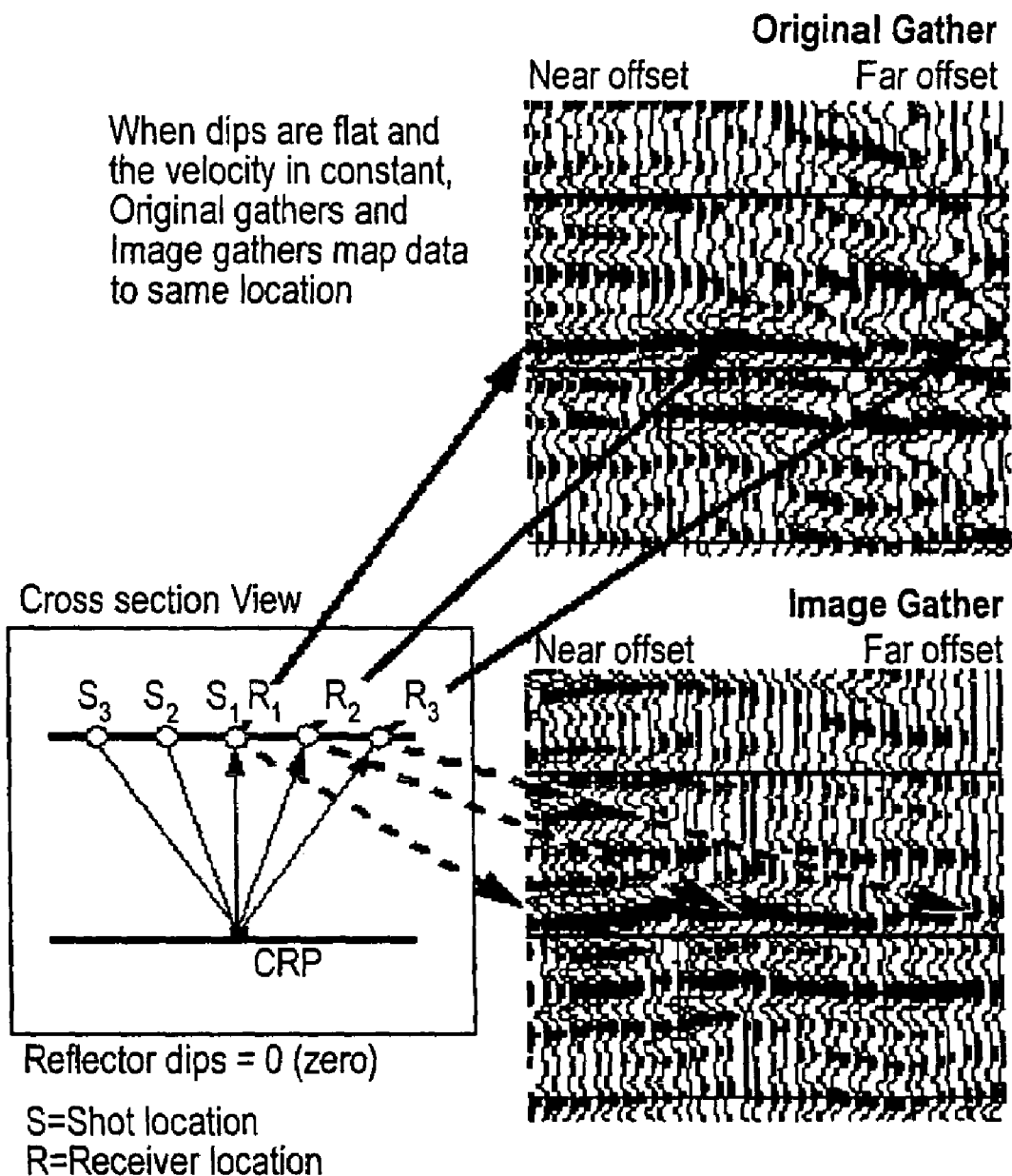
FIG. 4 illustrates the difference between an image offset gather and a traditional source-receiver offset gather for "flat" reflectors, according to one embodiment.
Figure 5:
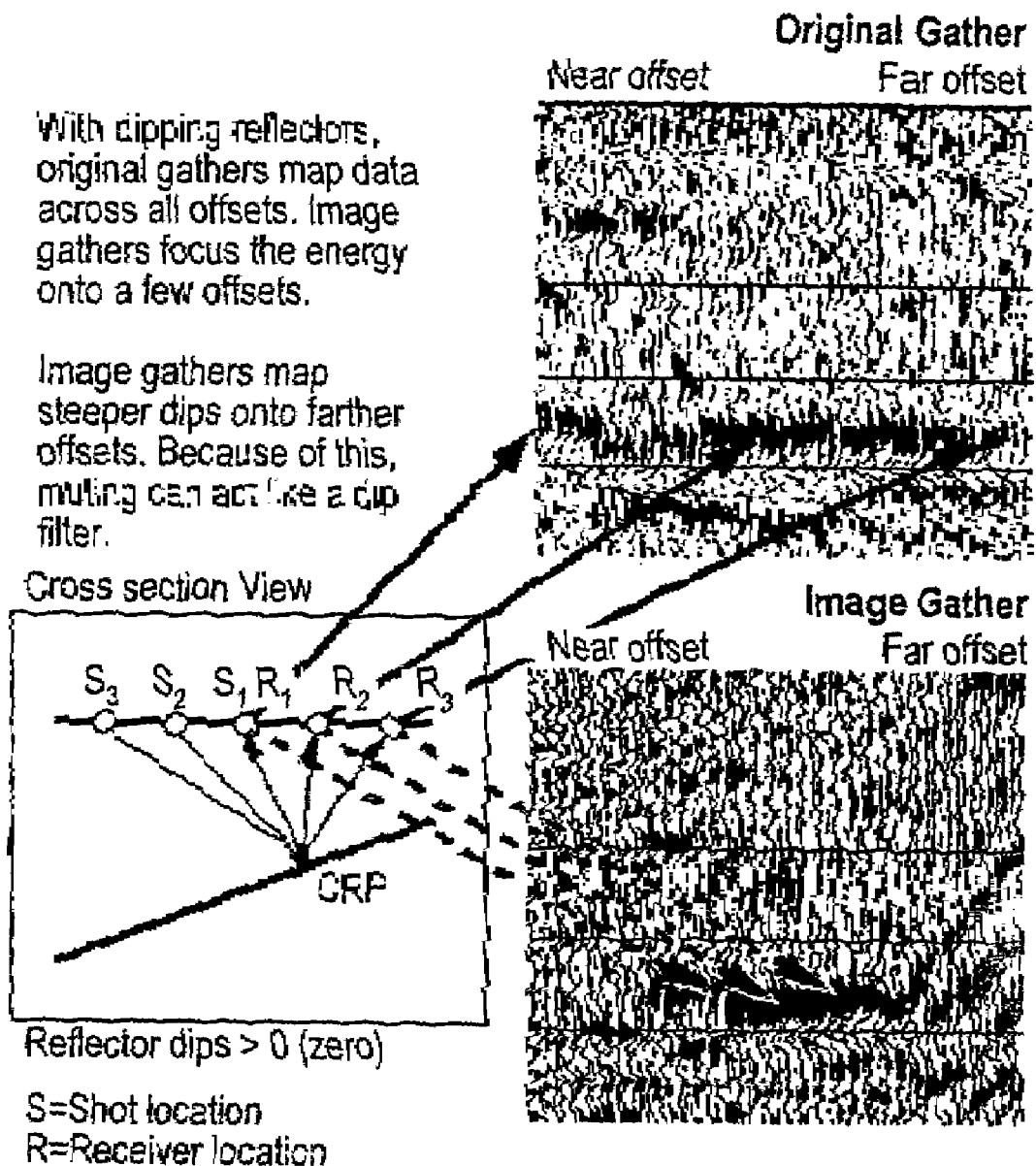
FIG. 5 illustrates the difference between an image offset gather and a traditional source-receiver offset gather for "dipping" reflectors, according to one embodiment.

FIGS. 4 and 5—Source-Receiver Offset Gathers and Image Offset Gathers for Flat and Dipping Reflectors FIGS. 4 and 5 compare an image gather ordered by image offset, and an image gather ordered by traditional source-receiver offset, for "flat" and dipping reflectors, respectively, according to one embodiment.

As FIG. 4 indicates, image gathers that are ordered by traditional source-receiver offset ("Original Gather") spread energy from flat reflectors across the entire gather. Image gathers that are ordered by image offset ("Image Gather") will spread energy from flat reflectors across a near range of offset traces. What are labeled as far offset traces in the Image Gather, are actually nearer image offset traces when the entire range of image offsets are considered. . In other words, in both cases, the gather traces are ordered such that the seismic energy is substantially evenly distributed over the range of the respective offsets. The cross section view provided to the left of the image gathers illustrates the underlying geometry that gives rise to these attributes of the gathers. Note that in the example shown, seismic energy from each source $S_1$–$S_3$ reflects from the flat reflector at a common image point and is then received by corresponding receivers $R_1$–$R_3$. As FIG. 4 shows, the presence of a flat reflector leads to symmetric travelpaths, and thus, symmetric offsets, for both the traditional and image offset approaches, resulting in the similar ordering of gather traces, and the substantially even distribution of energy across respective offsets.

In contrast, FIG. 5 illustrates the difference between an image offset gather and a traditional source-receiver offset gather for "dipping" reflectors, according to one embodiment. As above, a cross section view is provided illustrating the geometry of seismic reflections from a dipping reflector, where seismic energy from each source $S_1$–$S_3$ reflects from the dipping reflector at common reflection point CRP and is then received by corresponding receivers $R_1$–$R_3$. As FIG. 5 shows, the dipping reflector introduces asymmetries into the subsurface geometry, leading to asymmetric travelpaths, with different resulting effects on image offset and source-receiver offset gathers.

These differences in trace ordering and energy distribution are readily apparent in the Original Gather and Image Gather images of FIG. 5, where in the Original Gather, the traces are ordered such that the energy is distributed substantially evenly across the gather, while in the Image Gather (ordered by image offset), rather than being spread across the entire gather, the energy is concentrated. In other words, in the image offset gather approach, energy from dipping reflectors tends to be localized at non-zero offsets, i.e., image offset gathers with dipping reflectors tend to focus the energy at a few offset values. These image offsets will be greater than the image offset range observed in FIG. 4. In general, reflectors of increasing dip will concentrate energy at increasingly larger image offsets. It is noted that because image offset gathers typically map steeper dips onto farther offsets, muting (distance attenuation) may effectively act as a dip filter on the seismic data.

This unique aspect of image offset gathers may provide separation of energy with different travel paths, and thus may allow a user or analyst to identify, and optionally adjust or remove, anisotropic effects, noise, etc., in the gather.

Figure 6:
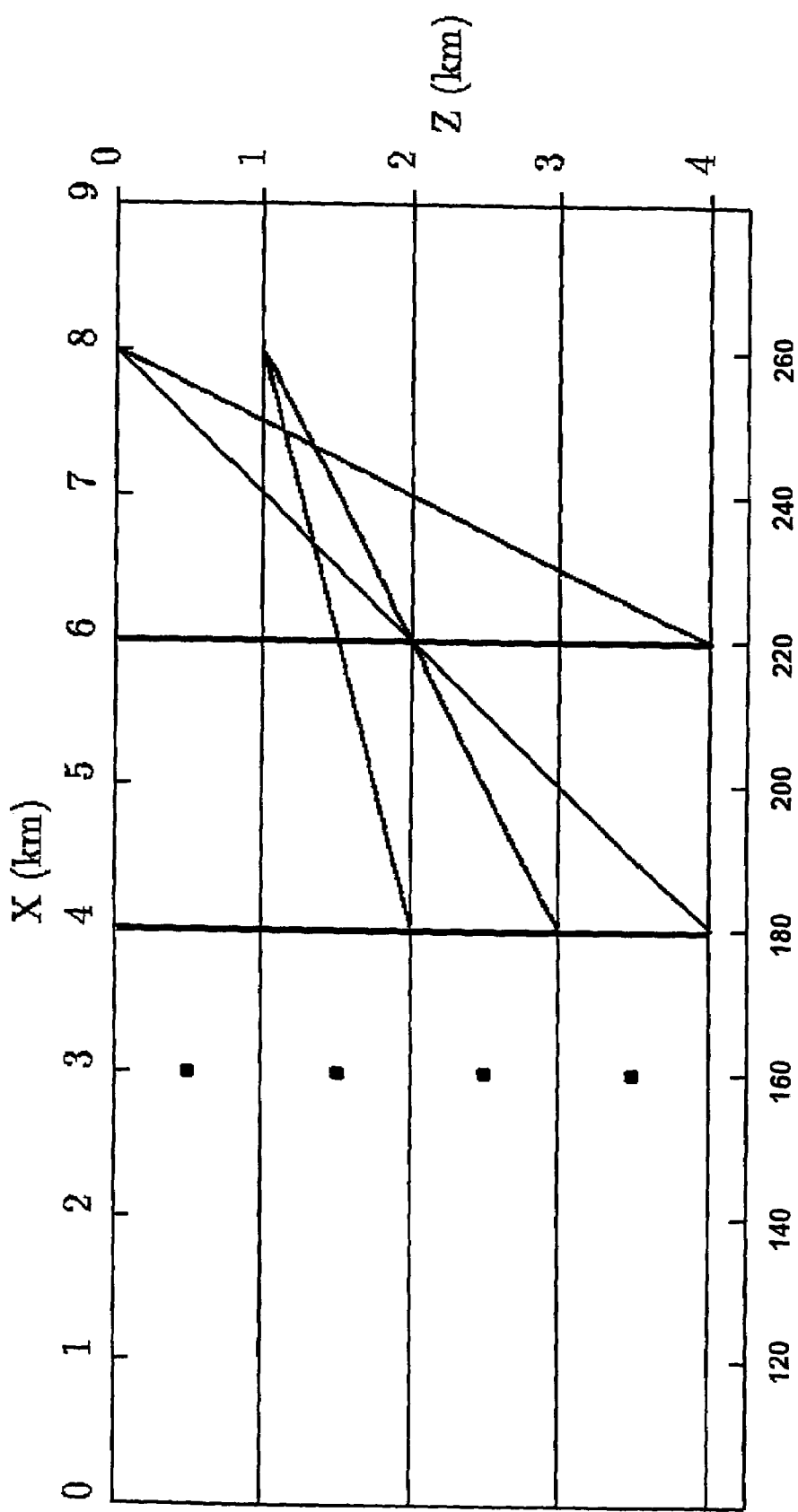
FIG. 6 illustrates a subsurface model with anisotropic effects, according to one embodiment.

FIG. 6—Subsurface Model with Anisotropic Effects

FIG. 6 illustrates a 2D subsurface model constructed to generate synthetic seismic data. The subsurface model contains both flat and dipping "geologic" events, and was assigned representative values of velocity and anisotropic parameters. A seismic forward modeling package was used to generate 2D synthetic pre-stack gathers that exhibit the effects of anisotropy. The vertical red lines are guides for evaluating the positioning accuracy of the imaged and stacked seismic data shown in FIG. 7.

Figure 7:
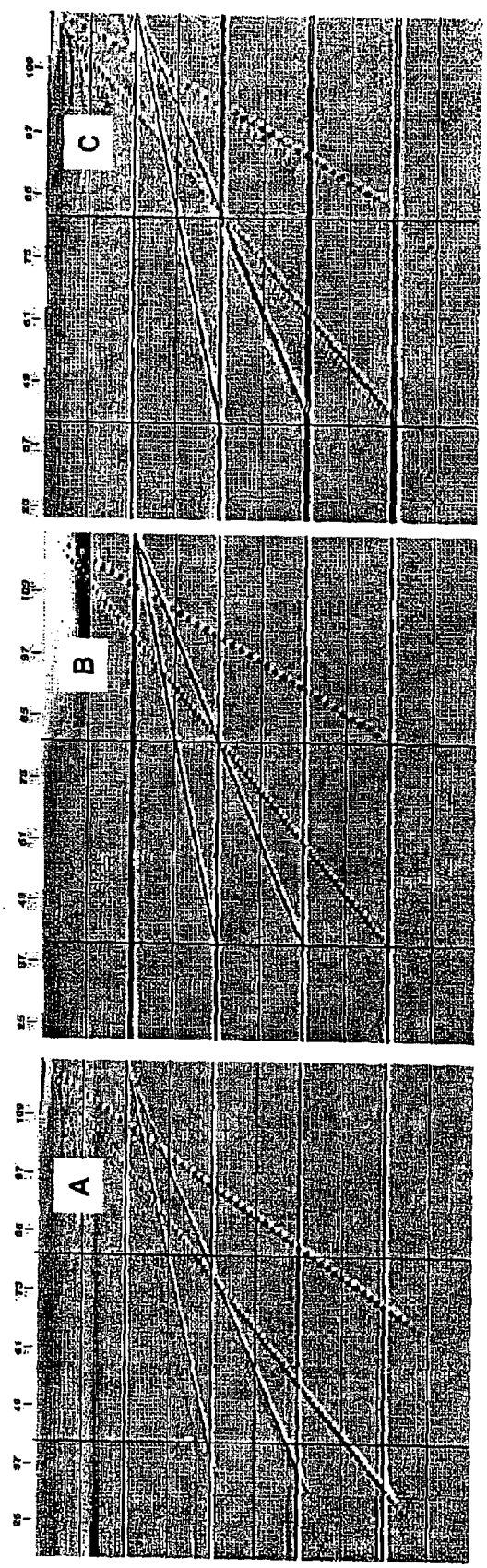
FIG. 7 illustrates imaged and stacked 2D synthetic seismic data, according to one embodiment.

FIG. 7—Imaged and Stacked 2D Synthetic Seismic Data

FIG. 7 illustrates three imaged and stacked images for the synthetic data created from the subsurface model shown in FIG. 6. FIG. 7(A) illustrates the results of a "traditional" seismic processing workflow that does not correct for anisotropic effects. This figure exhibits misalignment of the dipping events with respect to the vertical red lines, that coincide in the original model shown in FIG. 6. Flat energy is being positionied correctly, but has amplitude degradation due to the anisotropic effects. FIG. 7(B) illustrates the results of using a pre-stack imaging approach that corrects for anisotropy. The anisotropic parameters used in this imaging approach may be estimated using one of the embodiments described previously. Dipping energy in this figure are properly positioned and amplitudes along flat reflectors are strong and consistent. FIG. 7(C) illustrates the results of using post-imaging anisotropy corrections, using one of the embodiments described previously. Dipping energy is well positioned, with respect to the vertical red markers, and amplitude information is well preserved.

Figure 8:
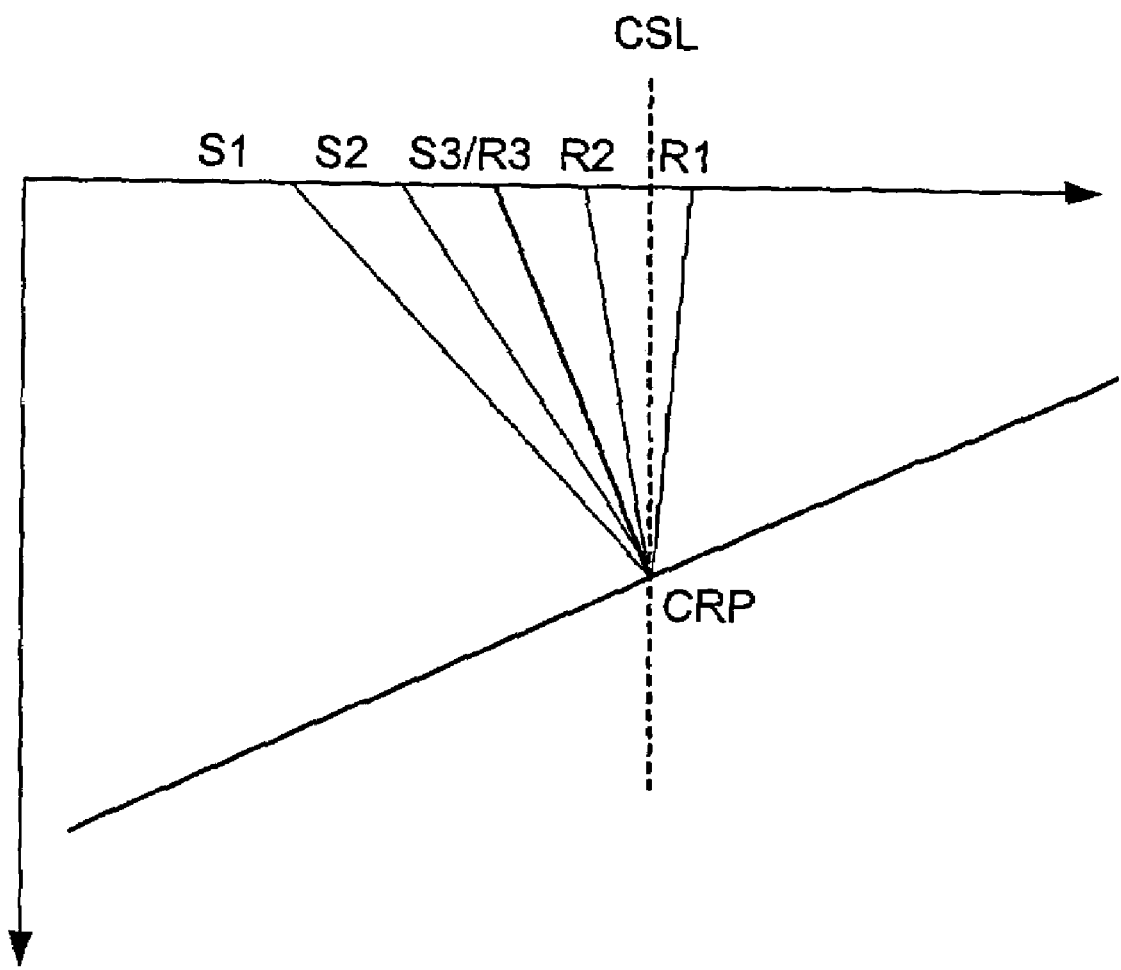
FIG. 8 illustrates an example geometry of an anisotropic correction in the post-migration (image-gather) domain, according to one embodiment.

FIG. 8—Geometry for Anisotropic Correction in Image-Gather Domain

FIG. 8 illustrates an example source-receiver reflection geometry for a simple dipping reflector and three pairs of sources and receivers (S1/R1, S2/R2, S3/R3). The Common Image Point (CIP), also known as the Common Reflection Point (CRP), represents the energy reflection point for this particular geometry. The Common Surface Location (CSL) is the surface location with the same spatial location as the subsurface CIP/CRP.

The seismic migration process takes seismic data with known source and receiver coordinates and maps the energy to certain CIP's/CRP's. A given CIP/CRP can be represented by a single "stacked" seismic trace or by any number of seismic traces, constituting an "image gather". The various traces within an image gather may represent the composite mapping of seismic energy from many surrounding locations. Various types of mapping criteria may be used to determine which seismic data will be mapped into the individual traces of the image gather.

The source-receiver offset distance organization is a common approach to defining the traces of an image gather. In this case, each trace in the image gather will represent a different source-receiver offset or range of offsets. If we consider the geometry in FIG. 8, the data migrated from the S3/R3 pair will be mapped to a source-receiver offset value of zero (since S3 and R3 are coincident). The data migrated from the S2/R2 pair will be mapped to a certain source-receiver offset value greater than zero. Finally, data migrated from the S1/R1 pair will be mapped to a certain source-receiver offset value, approximately twice as large as the S2/R2 value.

In contrast, one of many alternative mappings consists of organizing data by "image offset". Image offset is calculated by summing the source-to-CSL and CSL-to-receiver distance, rather than simply the source-receiver offset distance. If we consider the geometry in FIG. 8, data migrated from the S3/R3 pair will be mapped to a non-zero image offset value equal to the S3-to-CSL plus the CSL-to-R3 distance. The data migrated from the S2/R2 pair will be mapped to a slightly greater image offset than S3/R3, equal to the S2-to-CSL plus the CSL-to-R2 distance. Finally, data migrated from the S1/R1 pair will be mapped to a slightly greater image offset than S2/R2, equal to the S1-to-CSL plus CSL-to-R1 distance.

In general terms, all the source receiver pairs will migrate data to the same CIP/CRP. An output image gather, organized by source-receiver offset distance, will spread energy for the dipping reflector in FIG. 8 across a wide range of offsets. In contrast, an output gather organized by image offset distance, will localize the mapped energy for this dipping reflector to perhaps one or a few image gather traces, with similar source-to-CSL plus CSL-to-receiver offset distances. This character difference enables common image gathers ordered by image offset, or other "angle preserving" organization, to preserve reflector dip and angle of propagation information. This isolation of energy provides the opportunity to apply anisotropy corrections after the migration or imaging process.

Figure 9:
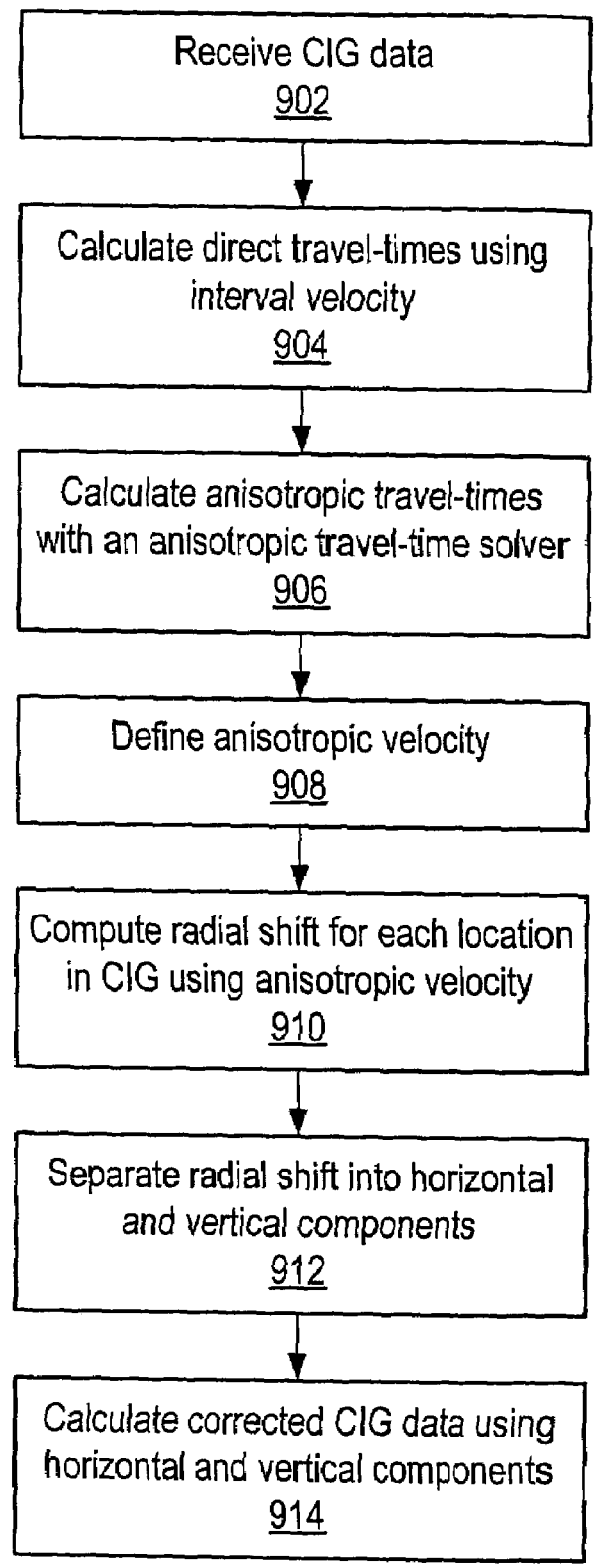
FIG. 9 flowchart of one embodiment of a method for calculating anisotropic corrections for common image gather data.

FIG. 9—Method for Calculating Anisotropy Corrections

FIG. 9 flowcharts one embodiment of a method for calculating anisotropic correction parameters. As noted above, in various embodiments, some of the steps described may be performed concurrently, in a different order than shown, or may be omitted. Additional steps may also be performed as desired.

In the embodiment described below, $P(x,z)$ represents the CIG data and $V(x,z)$ is the interval velocity used to generate the CIG (by isotropic pre-stack data migration (PSDM)). While this embodiment focuses upon a 2D seismic example, with coordinates x and z, other embodiments may incorporate 3D seismic data, among others. The post-migration anisotropic (kinematic) correction may be calculated in the following way:

In 902, direct travel-times $Tiso(x,z)$ may be calculated using $V(x,z)$ for a source at $x=0, z=0$.

Then, in 904, with any anisotropic travel-time solver, anisotropic travel-times $Taniso(x,z)$ may be calculated for a source at $x=0, z=0$, e.g., using any anisotropic travel-time solver, as is well known in the art. Anisotropic travel times may be calculated for single or multiple values of Thomsen or other anisotropic parameters. It should be noted that the anisotropic travel-time solver does not have to be restricted by a Vertical Transverse Isotropy (VTI) symmetry assumption. For a general model, the source location ($x=0, z=0$ in the local coordinate system) for a specific CIG may be placed at $X=Xcig$.

In 906, a (one-way) travel-time difference $DT(x,z)=Taniso(x,z)-Tiso(x,z)$ may be calculated. This travel-time difference may represent an estimate of the anisotropic effects on subsurface seismic wave propagation times.

In 908, an anisotropic velocity $VA(x,z)$ may be defined. In one embodiment, $VA(x,z)$ may be defined during a modeling process, e.g., in 904 above, which may use the interval velocity $V(x,z)$ and estimates of anisotropic parameters.

In 910, a radial shift $DR(x,z)$ for each location in the CIG may computed thusly:

$$DR(x,z)=2*DT(x,z)*VA(x,z).$$

This radial shift may represent an estimate of the effective mispositioning of seismic energy due to anisotropic effects.

Then, in 912, the radial shift $DR(x,z)$ may be split into $DX(x,z)$ and $DZ(x,z)$ components, e.g., by simple vector arithmetic. This step may simplifying the application of anisotropic corrections, although the full radial shift may be preferable for application, in certain embodiments.

Finally, in 914, the corrected CIG: $Pcorr(x+DX, z+DZ)=P(x,z)$ may be calculated. In other words, the original CIG data $P(x,z)$ is repositioned in accordance with the determined corrections for each CIG location. It should be noted that in some embodiments, horizontal isotropy may be assumed, although in other embodiments, this may not be the case. Further, in some embodiments, it may be preferable to apply anisotropic corrections as radial corrections, residual migrations or other mapping operation.

Expressed another way, in one embodiment, at least a portion of the received seismic data may be pre-stack time or depth migrated, thereby generating output to a plurality of common image gathers that substantially preserve aspects of relative subsurface seismic propagation angle. One or more anisotropy corrections to selected individual common image gathers of the plurality of common image gathers may be calculated using a 3D ray-tracing algorithm, as described above. The one or more anisotropy corrections may then be applied to the selected individual common image gathers of the plurality of common image gathers, thereby generating a corresponding one or more sets of corrected common image gathers.

Figure 10:
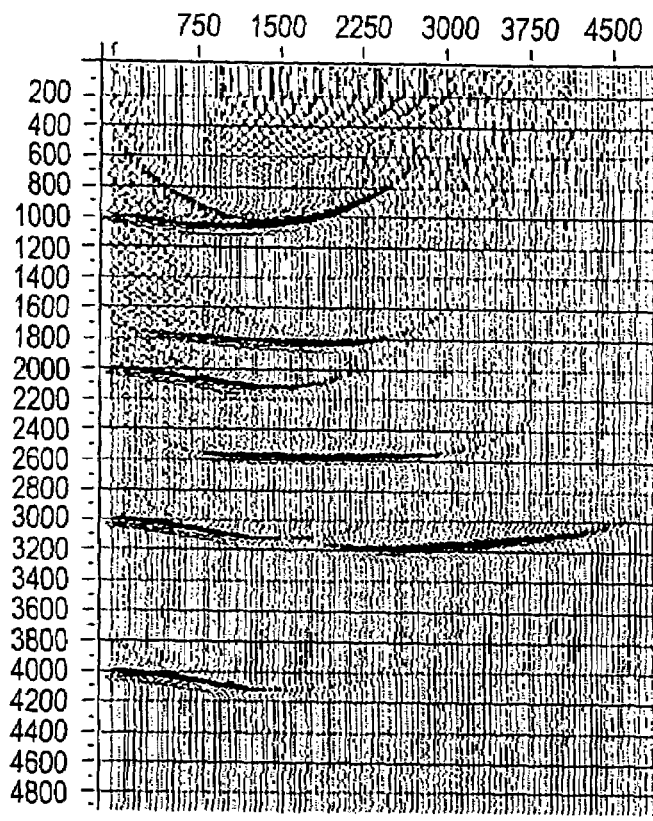
FIG. 10 illustrates an image gather output from a 2D pre-stack imaging operation, applied to a synthetic model with relatively moderate-to-high anisotropy characteristics, according to one embodiment.
Figure 11:
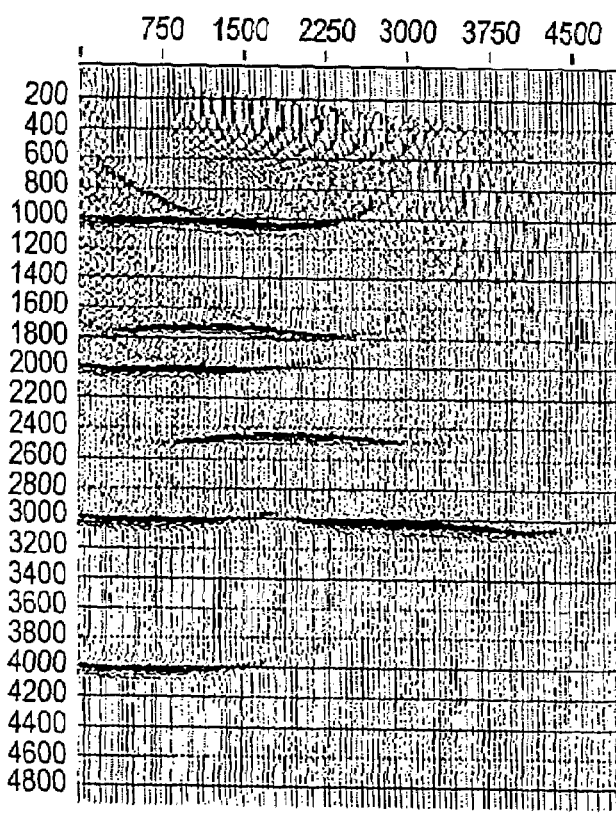
FIG. 11 illustrates image offset gather with anisotropic corrections applied, i.e., image offset gathers with radial (vertical and horizontal) corrections applied to correct for anisotropic effects, according to one embodiment.

Then, visual representations of the corrected common image gathers may be iteratively examined, and a best anisotropy correction of the one or more anisotropy corrections selected based upon flatness of data and correlation to well information, examples of which are shown in FIGS. 10 and 11 below. Anisotropic parameters corresponding to values of the best anisotropy correction at a plurality of times or depths, and spatial locations may then be collected to construct a vertically and horizontally varying estimation of anisotropy parameters for a subsurface volume corresponding to the seismic data. Finally, the seismic data (the entire set) may be prestack migrated using the collected anisotropy parameters to generate a set of corrected seismic data, where the set of corrected seismic data is usable in analyzing the formation.

Thus, the best corrections for various times or depths for the individual image gathers may be collected, and by analyzing multiple gathers from different spatial locations, the best corrections for specific x, y, and z location in the subsurface volume may be calculated. These corrections correspond to specific anisotropic parameters. These parameters may be used in travel-time calculations (e.g., using a travel-time calculator) to determine the physical correction to apply to the data, and so it is important to store the anisotropic parameters that produce the best anisotropic corrections. In one embodiment, interpolation may be used to determine anisotropic parameters for any location in the subsurface. In one embodiment, if there is little variation in the determined parameters, a single time or depth varying set of anisotropy parameters, or alternatively, a single pair of parameters, may be used for the entire volume. Note that even if a single pair of anisotropy parameters are used, the 3D ray tracing process may still provide a set of vertically and horizontally varying corrections as part of the migration process.

Note also that when re-migrating the entire set of seismic data with anisotropy corrections, migration algorithms are required that receive anisotropy parameters as input and compute the correct corresponding anisotropic corrections during the migration process.

FIGS. 10 and 11, described below, illustrate the effects of applying anisotropic corrections to seismic data, according to one embodiment of the present invention.

FIG. 10—Image Offset Gather Output from 2-D Pre-stack Imaging Operation

FIG. 10 illustrates an example image offset gather output from a 2-D pre-stack imaging operation applied to data from the synthetic anisotropy model described in FIG. 6. A 2D pre-stack imaging process that does not correct for anisotropy was applied to create this image gather. As shown in FIG. 10, image offset gathers may exhibit anisotropic effects as vertical, horizontal, radial, spatial or other misplacement and/or "non-flat" relative positioning with image offset. This image offset gather (in FIG. 10) corresponds to the model location of x=5 km in FIG. 6, and to the same offset location in the imaged and stacked section shown in FIG. 7(A). The misalignment and degraded amplitudes previously described are a result of incorrect positioning and flattening of energy in this image gather, due to uncorrected anisotropy effects. In the example of FIG. 10, a model of moderate-to-high anisotropy was used to illustrate the separation of seismic energy propagating along various subsurface orientations via the image offset approach. Seismic energy for near-vertical travel paths is aligned on the near image offset traces, while increasing travel-path energy falls on farther or greater image offsets. In this model, flat reflectors were located at depths of 1000, 2000, 3000 and 4000 meters. Dipping events intersect this image location at depths of approximately 1800, 2600 and 3000 meters.

FIG. 11—Image Offset Gather With Anisotropic Corrections

FIG. 11 illustrates the image offset gather of FIG. 10, but with anisotropic corrections applied, i.e., image offset gathers with vertical, horizontal, radial, spatial or other corrections applied to correct for anisotropic effects. As noted above, corrections may be applied to the image offset gather being analyzed in a number of ways, such as, for example, interactive corrections, or static application to multiple copies of the image offset gather, among others. In some embodiments, the corrections applied may be varied until the corrected seismic data are as flat as possible, and the corresponding anisotropic parameters identified and output or stored. Alternatively, various values of anisotropic parameters may be used to generate corresponding corrections which may then be applied to the data, and those values resulting in the flattest corrected data selected and output or stored. The illustrated image gather in FIG. 10 corresponds to an offset of 5 km in both the model of FIG. 6 and the imaged and stacked section in FIG. 7(C). The accurate positioning and amplitude preservation of FIG. 7(C) is due to the flattening and other positioning effects of the anisotropy corrections applied to create the image gather in FIG. 11.

As noted above, the calculated anisotropic corrections may be applied to all or any subset of the pre-stack seismic data in various ways. In a preferred embodiment, the corrections may be efficiently applied as vertical, horizontal, radial, spatial or other shifts to individual traces output from the pre-stack imaging operation (204 of FIG. 2), as shown in FIG. 5, after which the traces may be accessed as image offset gathers, common image offset gathers, or various other ensemble arrangements, as desired. Further details of the analysis and correction of image gathers are provided above with reference to FIG. 2.

Note that after corrections, the curvatures in both the near and far image offset events have largely been "flattened". Also note the vertical movement due to the corrections, particularly in the farther offset image traces. For example, the longer travel path energy (greater image offset) aligning at approximately 3000 m, was moved from a level of about 3200 m on the uncorrected gather (see FIG. 10). It is noted that these corrected distances could mean the difference between drilling a "dry" oil well and a productive oil well.

Thus, image offset gathers may provide a useful tool for separating seismic energy based on dipping angle of subsurface reflectors, and for subsequent correction of anisotropic effects in seismic data, where the determined corrections are based on, or correspond to, anisotropic parameter values, e.g., Thomsen parameter values. As described above with reference to FIG. 2, once the seismic data have been imaged and anisotropic corrections applied, some of all of the data associated with individual image locations may be stacked or otherwise transformed or analyzed, where the results (e.g., the stacked or transformed traces, analysis results, additional seismic processing, etc.) provide a substantially more accurate subsurface image than prior art methods without anisotropic corrections.

Further details of dipping reflector geometries and offsets are presented above with reference to FIGS. 6 and 7.

Thus, image (offset) gathers may be computed using image offsets as opposed to the traditional source-to-receiver offsets, and used to estimate anisotropic corrections which may then be used to correct the image gather data. The corrected image gather data may then allow more accurate analysis and characterization of related subsurface formations.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

It is noted that the methods described herein, or any subset thereof, may be implemented in program instructions executable on one or more programmable processors (e.g., on the processing unit 110 of FIG. 1, or on a network of computers).

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

The Appendix attached hereto, entitled "Post-Imaging Seismic Anisotropy Corrections", represents one collection of embodiments and is not meant to be limiting. The Appendix is incorporated by reference in its entirety.

We claim:

1. A method for analyzing seismic data from a formation, the method comprising:
   receiving pre-stack seismic data, wherein the pre-stack seismic data includes a plurality of pre-stack seismic traces;
   imaging the pre-stack seismic data to produce pre-stack depth-imaged seismic data;

organizing the pre-stack depth-imaged seismic data into organized pre-stack depth-imaged seismic data that substantially preserve aspects of relative subsurface dip angle;

determining one or more anisotropic parameters based on the organized pre-stack depth-imaged seismic data, wherein said determining is performed in the depth domain;

applying the determined one or more anisotropic parameters to at least a subset of the pre-stack depth-imaged seismic data, wherein said applying produces corrected seismic data; and storing the corrected seismic data on a computer-readable memory medium, wherein the corrected seismic data are usable in analyzing the formation.

2. The method of claim 1, further comprising:
collecting the pre-stack seismic data from a plurality of source and receiver locations.

3. The method of claim 1, wherein said pre-stack seismic data are obtained from a p-wave seismic survey.

4. The method of claim 1, wherein said pre-stack seismic data are obtained from an s-wave seismic survey.

5. The method of claim 1, wherein said pre-stack seismic data are obtained from a mode-converted seismic survey.

6. The method of claim 1, wherein said pre-stack seismic data are obtained from a Vertical Seismic Profile seismic survey.

7. The method of claim 1, wherein said pre-stack seismic data are obtained from a surface or subsurface seismic tomography survey.

8. The method of claim 1, wherein said imaging comprises performing a two-dimensional migration on the pre-stack seismic data.

9. The method of claim 1, wherein said imaging comprises performing a three-dimensional migration on the pre-stack seismic data.

10. The method of claim 1, wherein said organizing comprises ordering the pre-stack depth-imaged seismic data by a source-to-common surface location plus common surface location-to-receiver distance.

11. The method of claim 1, wherein said organizing comprises ordering the pre-stack depth-imaged seismic data by a total source-to-image point plus image point-to-receiver distance.

12. The method of claim 1, wherein said organizing comprises ordering the pre-stack depth-imaged seismic data by incidence or reflection angle.

13. The method of claim 1, wherein said organizing comprises ordering the pre-stack depth-imaged seismic data by a representation of estimated reflector dip.

14. The method of claim 1, wherein said determining comprises analyzing the organized pre-stack depth-imaged seismic data to determine the one or more anisotropic parameters.

15. The method of claim 1, wherein said determining comprises analyzing the organized pre-stack depth-imaged seismic data for anisotropic effects.

16. The method of claim 1, wherein said determining comprises analyzing the organized pre-stack depth-imaged seismic data for anisotropic corrections.

17. The method of claim 1, wherein said applying comprises applying vertical and/or horizontal mapping shifts to the pre-stack seismic data.

18. The method of claim 1, wherein said applying comprises applying radial mapping shifts to the pre-stack seismic data.

19. The method of claim 1, wherein said applying comprises mapping the pre-stack seismic data across spatial image locations.

20. The method of claim 1, wherein said applying comprises making amplitude, phase, or frequency adjustments to the pre-stack seismic data.

21. The method of claim 1, wherein said applying comprises re-imaging the received pre-stack seismic data using the determined one or more anisotropic parameters.

22. The method of claim 1, wherein said applying comprises applying a residual migration mapping operation to the pre-stack seismic data.

23. The method of claim 1, further comprising:
stacking the corrected seismic data to produce corrected stacked traces, wherein the corrected stacked traces are useable in analyzing the formation.

24. The method of claim 23, further comprising:
providing a representation of the corrected stacked traces to a display device for user observation.

25. The method of claim 1, wherein said corrected seismic data comprises corrected pre-stack seismic traces.

26. The method of claim 25, further comprising:
providing a representation of the corrected pre-stack seismic traces to a display device for user observation.

27. The method of claim 1, further comprising:
analyzing the corrected seismic data to produce seismic analysis results, wherein the seismic analysis results are useable in analyzing the formation.

28. The method of claim 1, wherein said analyzing comprises one or more of:
amplitude vs. angle (AVA) analysis;
amplitude vs. offset (AVO) analysis;
lithology and fluid estimation; and
pre-stack inversion.

29. The method of claim 1, further comprising:
applying additional seismic processing after said applying the anisotropic parameters.

30. A system for analyzing seismic data from a formation, comprising:
a processor;
a computer-readable memory medium coupled to the processor; and
an input, operable to receive seismic data, wherein the seismic data includes a plurality of pre-stack seismic traces;
wherein the computer-readable memory medium stores program instructions which are executable by the processor to:
image the received seismic data to produce pre-stack depth-imaged seismic data;
organize the pre-stack depth-imaged seismic data into an arrangement that substantially preserves aspects of the relative dip angle in the subsurface;
determine one or more anisotropic parameters based on the organized pre- stack depth-imaged seismic data, wherein said determining is performed in the depth domain; and
apply the determined anisotropic parameters to at least a subset of the pre- stack depth-imaged seismic data, wherein said applying produces corrected seismic data;
wherein the corrected seismic data are usable in analyzing the formation.

31. A computer-readable memory medium that stores program instructions, wherein the program instructions are executable to implement:

receiving seismic data corresponding to a formation, wherein the seismic data includes a plurality of pre-stack seismic traces;

imaging the seismic data to produce pre-stack depth-imaged seismic data;

organizing the pre-stack depth-imaged seismic data into organized pre-stack depth-imaged seismic data that substantially preserve aspects of relative subsurface dip angle;

determining one or more anisotropic parameters based on the organized pre-stack depth-imaged seismic data, wherein said determining is performed in the depth domain;

applying the determined one or more anisotropic parameters to at least a subset of the pre-stack depth-imaged seismic data, wherein said applying produces corrected seismic data;

storing the corrected seismic data in a memory, wherein the corrected seismic data are usable in analyzing the formation.

32. The computer-readable memory medium of claim 31, wherein the program instructions are executable to further implement:

stacking the corrected seismic data to produce corrected stacked traces, wherein the corrected stacked traces are useable in analyzing the formation.

33. The computer-readable memory medium of claim 32, wherein the program instructions are executable to further implement:

providing a representation of the corrected stacked traces to a display device for user observation.

* * * * *